United States Patent [19]

Hubred et al.

[11] Patent Number: 4,600,483
[45] Date of Patent: Jul. 15, 1986

[54] ELECTROLYTIC REDUCTION OF COBALTIC AMMINE

[75] Inventors: Gale L. Hubred, Richmond; Michael Dubrovsky, Albany, both of Calif.

[73] Assignee: Chevron Research Company, San Francisco, Calif.

[21] Appl. No.: 672,777

[22] Filed: Nov. 19, 1984

[51] Int. Cl.⁴ .............................................. C25F 5/00
[52] U.S. Cl. ................................. 204/130; 204/112
[58] Field of Search ............................ 204/112, 130

[56] References Cited

U.S. PATENT DOCUMENTS

| | | | |
|---|---|---|---|
| 2,595,387 | 5/1952 | Kalling et al. | 204/112 |
| 3,124,520 | 3/1964 | Juda | 204/86 |
| 3,929,468 | 12/1975 | Siemens et al. | 204/112 |
| 4,175,014 | 11/1979 | Crnojevich et al. | 204/130 |
| 4,269,678 | 5/1981 | Faul et al. | 204/130 |
| 4,288,305 | 9/1981 | Garritsen et al. | 204/112 |

Primary Examiner—R. L. Andrews
Attorney, Agent, or Firm—S. R. LaPaglia; W. K. Turner

[57] ABSTRACT

A process for the reduction of $Co^{III}$ to $Co^{II}$ in an aqueous ammoniacal solution in the presence of a porous cathode is disclosed.

9 Claims, 3 Drawing Figures

CHANGES IN THE OXIDATION POTENTIAL OF THE SOLUTION DURING ELECTROREDUCTION

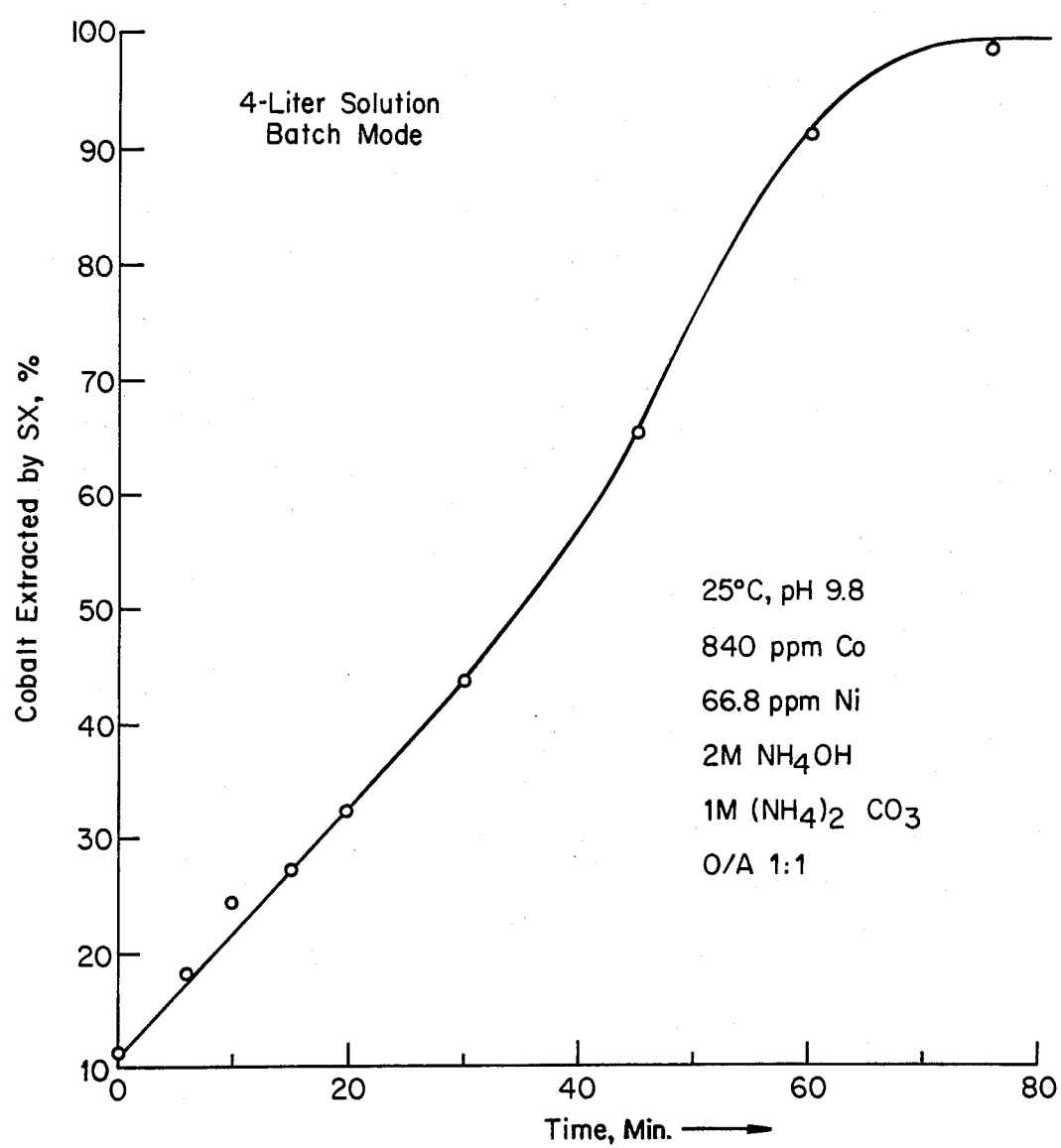

ELECTROLYTIC REDUCTION OF COBALTIC AMMINE

TECHNICAL FIELD

This invention relates to an electrolytic process for the reduction of $Co^{III}$ to $Co^{II}$ in an aqueous ammoniacal solution. More particularly, it relates to the reduction of $Co^{III}$ to $Co^{II}$ in the presence of a porous cathode.

BACKGROUND OF THE INVENTION

It is known to use ammoniacal-ammonium salt solutions for the recovery of cobalt from oxide ores, as well as from spent hydroprocessing catalyst. Exemplary of this type of art is U.S. Pat. No. 3,929,468 which discloses a selective reduction, oxidizing ammonia leach process from oxide ores, and U.S. Pat. Nos. 3,567,433; 4,442,074; and 4,432,949 which disclose the oxidative roasting and leaching of spent hydroprocessing catalyst with aqueous ammonia and ammonia salt solutions. The cobalt after it is extracted from the oxide ore or spent catalyst is in the +3 oxidation state.

It is also known in the prior art to extract cobaltic ion from an ammoniacal leach solution using (1) an x-hydroxy oxime such as described in U.S. Pat. Nos. 3,276,863 and 3,929,468 and (2) a beta-diketone as described in U.S. Pat. No. 4,258,016.

Additionally, the conversion of cobaltic ion to cobaltous ion by contacting the trivalent cobalt with cobalt metal is generally known as illustrated by D. N. Nelsen, R. E. Siemens, and S. C. Roads, "Solvent Extraction of Cobalt from Laterite - Ammoniacal Leach Liquors", U.S. Bureau of Mines, RI 8419.

Since most of the ammoniacal leaching operations for cobalt extraction are carried out under oxidizing conditions, the cobalt is in the cobaltic (III) rather than the cobaltous (II) ammine form. As a result, solvent extraction operation for cobalt removal with extractants such as hydroxy-oximes and beta-diketones requires a reduction step that will reduce the cobaltic III ammine species. Economic evaluation indicates that use of cobalt metal to reduce $Co^{III}$ to $Co^{II}$ is cost prohibitive because of the high cobalt inventory associated with this process and therefore other ways to reduce cobaltic (III) ammine must be found.

While U.S. Pat. No. 3,929,468 indicates that cobalt may be reduced from its trivalent state to its divalent state electrolytically, no other details are given for carrying out such a process.

The present invention provides an electrochemical process which is a sample and an economically convenient process for carrying out this reduction step.

SUMMARY OF THE INVENTION

In accordance with the present invention, there has been discovered an electrolytic process for the reduction of $Co^{III}$ to $Co^{II}$ in an aqueous ammoniacal solution in an electrolytic cell, comprising an anode compartment, a cathode compartment and a permeable membrane in contact with the anode and located between the anode and cathode compartments and wherein said cathode compartment contains a porous electrode having a porosity in the range of from about 30 to 60 percent comprising introducing the aqueous ammoniacal cobaltic (III) solution into the cathode compartment of the electrolytic cell, providing an aqueous electrolyte in the anode compartment, applying direct current to the anode and cathode to produce cobaltous (II) ions in the cathode compartment while substantially preventing migration of cobaltous (II) anions between the cathode and anode compartments by maintaining a permeable barrier between the anode and the porous cathode, removing produced gas from the anode compartment and removing the electrolyte containing cobaltous (II) ions from the cathode compartment.

BRIEF DESCRIPTION OF THE DRAWINGS

FIG. 3 shows the corresponding cobalt extraction values as obtained by a solvent extraction step using LIX 51 extractant applied to the electroreduced solution.

DETAILED DESCRIPTION OF THE INVENTION

The present invention provides an electrolytic method for reducing $Co^{III}$ to $Co^{II}$ in aqueous ammoniacal solutions which contain small amounts of $Co^{III}$, for example, less than 10 grams per liter and preferably in the range of from about 0.1 to 10 grams per liter.

In the method of the present invention, the aqueous ammoniacal, ammonium salt solution is passed through the electrolytic cell having a porous cathode and the reduction of $Co^{III}$ to $Co^{II}$ takes place at the porous cathode.

Figure 1:
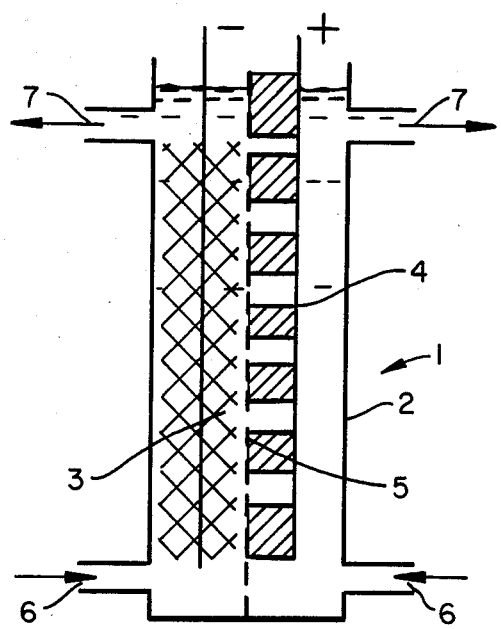
FIG. 1 is a schematic representation of an electrolytic cell used in the process of the present invention.

The cell 1, which may be used for carrying out the present invention, is shown in FIG. 1 and comprises a cell container or body 2, a porous cathode 3, an anode 4, and a permeable membrane 5 to separate the anode and cathode compartments of the electrolytic cell 1. The anode is in contact with the permeable membrane. The cathode may or may not be in contact with the permeable membrane, however, it is preferable that the cathode does make contact with the membrane. The cell body 2 includes an opening 6 and 7, for admitting or removing solution The cathode compartment of the electrolytic cell contains a catholyte solution which initially contains the cobaltic (III) ammine solution as further described hereinafter. The anode compartment of the electrolytic cell contains an anolyte solution, as further described hereinafter. The anode 4 and the cathode 3 are connected to a suitable source of direct current power source at their terminals. Heating or cooling means may also be provided to maintain the anolyte and the catholyte at the desired operating temperatures.

The method of the present invention includes passing the catholyte solution containing cobaltic (III) ammine through a porous cathode cell (and thus through the porous cathode) while the cathode is under sufficient electrical potential to reduce the cobaltic (III) ammine to cobaltous (II) ammine. In the simple case, the electroreduction of the cobaltic ammine from ammoniacal solution at pH 9.5 may be described by the following equation:

$$Co(NH_3)_6^{+3} + 2e \rightarrow Co(NH_3)_6^{+2} \quad E^\circ = 0.108 \text{ Volts} \tag{1}$$

The same or similar equation as (1), describes the electroreduction of more complex cobalt species which may be also present in solutions such as aqueous cobaltic ammine, sulfate cobaltic ammine and the like.

In the course of the electroreduction process, two side reactions can be expected to occur at the cathode.

Cobaltous Reduction $$Co(NH_3)_6^{+2} + 2e \rightarrow Co_{(5)} + 6(NH_3)aq \quad E° = -0.42 \text{ Volts} \tag{2}$$

Water Reduction $$2H_2O + 2e \rightarrow H_2 + 2OH^- \quad E° = -0.45 \text{ Volts} \tag{3}$$

The equilibrium potential for both of the latter side reaction is so close that they probably occur simultaneously. Based on the large differences in the equilibrium potentials between the cobaltic reduction and the side reactions, the cobaltic reduction can be considered as the main reaction. The side reactions are expected to occur under conditions in which cobaltic concentration has decreased to the extent that the transfer of cobaltic species to the electrode is rate limiting. These conditions are expected to occur at the end of the electroreduction step and typically when the cobaltic concentration is below 100 ppm. The conventional electrolysis of water producing $O_2$ gas occurs at the anode or any other suitable anode reaction may be used.

The electrolytic cell may be operated at a constant current mode of from about 10 to 200 amperes/ft$^2$ and preferably from 10 to 50 amperes/ft$^2$, and at cell voltages ranging from about 3 to 8 and preferably from about 4 to 5 volts.

The temperature of the catholyte may be from about 20° C. to about 90° C. and preferably from about 20° C. to 30° C. The temperature of the anolyte may fall within the same range as given for the catholyte and preferably is within about 5° C. of the catholyte temperature.

The anode 4 may be comprised of any electrically conductive, stable material. The anode preferably has a low over voltage and is resistant to corrosion and/or decomposition. Representative of anode materials are lead, a platinum group metal, titanium coated with a platinum group metal, and carbonaceous materials such as carbon or graphite. As used herein, the term "platinum group metals" include all the metals of the platinum group, namely, ruthenium, rodium, palladium, osmium, iridium, and platinum. Furthermore, the oxide of the platinum metals or mixtures of two or more such oxides could be used as coating on the titanium metal. Anode materials which were found especially well suited include $RuO_2/TiO_2$ on a Ti substrate or $IrO_2/TiO_2$ on a Ti substrate, which anodes are both commercially available.

The cathode 3 is comprised of a porous electrode material through which the catholyte passes through. Porous electrodes employed in the electrolytic cell of the present invention may be any suitable electrodes having a porosity in the range of from about 30 to about 60 percent. The porosity is defined as the ratio of the void to the total volume of the electrodes. Representative materials which may be used as cathode materials include sintered metals, sponge or gauze, as well as carbonaceous materials. The porous cathode materials, for example, may be made from platinum or steel, or of materials which may be coated with an electroconductive metal. In one embodiment, the porous electrodes are fabricated from a fine mesh or a perforated sheet or plate having a porosity of about 30 percent. A preferred embodiment of the porous electrode is a three-dimensional electrode such as a reticulate electrode. These electrodes have increased surface area and particularly increased internal surface area. Their porosities are in the range of from about 30 to about 60 percent. The thickness of the cathode may vary depending upon such things as cathode material, cathode porosity, and the solution flow rates.

Various membranes which contact the anode and may optionally and preferably contact the cathode may be used in this invention. Such membranes are well-known in the electrolysis art and include porous glass frits, spun or woven asbestos, porous reinforced polymers, automotive battery-type separators (Daramic, supplied by Grace Corporation), and ion permselective membranes.

Typically, the ion permselective membrane, which may be anionic or cationic, is an ion-exchange membrane or sheet which is substantially impermeable to the aqueous electrolyte. These ion-exchange membranes are well-known per se and include both membranes where ion-exchange groups or materials are impregnated in or distributed throughout a polymeric matrix or binder, as well as those where such groups are associated only with the outer surface of a membrane backing or reinforcing fabric. Continuous ion-exchange membranes, in which the entire membrane structure has ion-exchange characteristics and which may be formed by molding or casting a partially polymerized ion-exchange resin into sheet form, may also be used.

The electrolytic conversion of $Co^{III}$ to $Co^{II}$ may be done in a batch operation wherein the anolyte and catholyte are recirculated from their respective reservoir through inlet 6 located near the bottom of the cell and allowed to overflow through outlet 7 near the top of the cell back to the reservoir until the desired depletion level is achieved.

The process may also be carried out under continuous flow conditions using a cascade system of cells in which the solution is cascaded through a reservoir, through the cascade of cells, each having an inlet located near the bottom and an overflow outlet at the top, the depleted solution being collected in a separate reservoir.

It is also possible that, during the operation of the process of the present invention, cobalt metal may be formed on the cathode. This cobalt metal deposit can be fully stripped from the electrodes after the current has been terminated by passing fresh cobaltic ammine solution through the cathode compartment. Generally, this dissolution period is a relatively short duration, e.g., a few hours or less.

Also, since the cobaltous ammine product obtained according to the process of this invention may be oxidized by air back to cobaltic ammine, it is preferable that the process forms under an inert atmospheric blanket such as by the use of nitrogen or at least isolated from air.

The catholyte, i.e., the electrolyte in the cathode compartment, is an aqueous solution containing both $NH_3(aq)$ hereinafter ammonia, and $NH_4^+(aq)$ hereinafter ammonium. Ammonia is present in sufficient amount such that $Co^{III}$ and $Co^{II}$ are both soluble. Preferably, the concentration of ammonia should be from about 1M to 2M and the concentration of ammonium should preferably be in the range of from about 1M to 2M and most preferably equal to the ammonia concentration. Preferred ammonium salts include ammonium sulfate and ammonium carbonate. The pH of the aqueous catholyte should be from about 3 to 12 and preferably from 8.5 to 11. The concentration of $Co^{III}$ in the catholyte may range from a saturated solution to about 100 ppm and preferably from about 10,000 to 100 ppm.

The anolyte, i.e., the electrolyte in the anode compartment, may be any aqueous solution of a compatible electrolyte material. Typically, the anolyte will be an ammoniacal solution similar to that used in the cathode compartment, as well as aqueous solutions containing other salts such as sodium sulfate, sodium carbonate and the like. Typically, the concentration of salt solutions should be close to saturation and preferably ranges from about 1 to 2 molar in the anolyte solution.

As noted from U.S. Pat. Nos. 4,434,141; 4,432,953; 4,152,396; and 4,258,016, which references are incorporated herein by reference, after the $Co^{III}$ has been reduced to $Co^{II}$, the $Co^{II}$ may be extracted from the ammoniacal solution by the use of fluorinated beta-diketones or alpha-hydroxy oximes. The fluorinated beta-diketones described in U.S. Pat. No. 4,152,396 and the hydroxy oximes described in U.S. Pat. Nos. 4,434,141; 3,855,090; 3,907,966; and 3,853,725, which patents are hereby incorporated by reference into this application, are preferred. A particularly preferred beta-diketone is one sold by Henkel Corporation under the trade name LIX 51 and a particularly preferred hydroxy oxime is one also sold by Henkel Corporation under the trade name LIX 64.

The cobalt may be stripped from the organic extractants by several of any alternatively known prior art methods. One conventional stripping technique frequently used is stripping the cobalt values with sulfuric acid to produce the cobalt sulfate in the aqueous phase. The aqueous solutions containing the stripped cobalt can be further processed to produce pure metal or alternatively the salt can be used directly to form a new catalyst. The cobalt can be electrowon or directly reduced by hydrogen gas. The aqueous solutions can be used directly as a metal source for impregnating or co-mulling new catalysts.

Figure 2:
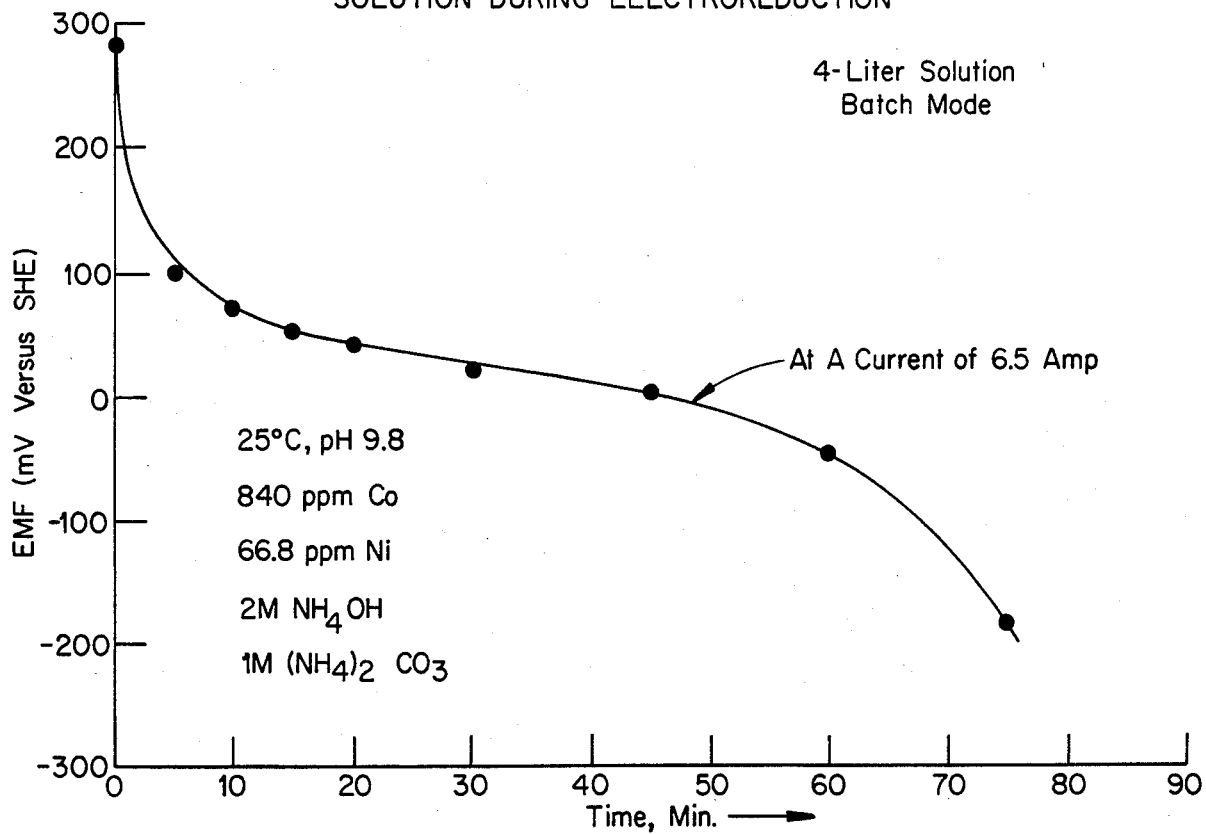
FIG. 2 shows the changes in the solution potential in the course of the electroreduction.

The end point at which the $Co^{III}$ has been reduced to $Co^{II}$ and is ready for solvent extraction is found by measuring the Eh of the catholyte solution. For a successful solvent extraction, the catholyte solution has to be brought by electroreduction to a potential of $-50$ mv to $-100$ mv versus SHE. Typical changes in the solution potential in the course of electroreduction are shown in FIG. 2, and the corresponding cobalt extraction values as obtained by subsequent solvent extraction step using LIX 51 applied to the electroreduced solution are shown in FIG. 3.

The present invention is further illustrated by the following examples.

EXAMPLES

EXAMPLE 1

The cell used was of a rectangular side by side type and was constructed of Lucite similar to that shown in FIG. 1. The anode and cathode compartment both had inside dimensions of 400×60×20 mm. The porous cathode consisted of seven demister pads made of 304 stainless steel mesh and packed together. The cathode had a porosity of 45 percent. A current feeder was positioned on the part of the cathode compartment most remote from the anode and consisted from 304 stainless steel. The anode and cathode compartment were separated by a diaphragm measuring 520×150 mm. The anode used was a dimensionally stable anode (DSA) in the form of coated titanium mesh and measured 600×60 mm. It was located adjacent and in contact to the diaphragm. Current and total cell voltage were recorded on strip chart recorders. Catholyte and anolyte were supplied to the cell from separate systems consisting of reservoirs and pumps. The diaphragm used in these experiments was "Daramic" supplied by W. R. Grace and typically used as an automotive battery separator. This porous material showed a low electrical resistance (0.8 ohm.cm$^2$ in 1 molar sodium chloride at 18° C.) and due to a very small pore size of 0.1 micron, showed negligible permeability to electrolyte solutions at the pressure differential encountered in this experiment.

Four liters of ammoniacal solutions were obtained from pilot plant leach of a spent hydroprocessing catalyst. The solution had the following composition: $Co^{III}$, 840 ppm; Ni 66.8 ppm, V 268 ppm; Mo 537 ppm; 2M ammonia, 1M ammonium carbonate, pH 9.8, the oxidation potential of the solution as measured against a standard Calomel electrode was +60 MV. The anode solution used was 1M sodium sulfate, pH 9.8. The temperature of the solution was 25° C. Both anolyte and catholyte solutions were pumped at 9.25 gallons per minute through the appropriate compartments. A current of 6.5 amps (equivalent to 2.5 amperes per sq. feet of cell cross sectional area) was applied at a cell voltage of 2.65 volts. The electrolysis was carried out for 70 minutes and at this point the oxidation potential of the solution dropped to $-390$ MV against a standard Calomel electrode. At the end of the run, the solutions were contacted with LIX-51, a fluorinated beta-diketone supplied Henkel Corporation, and 98.8 percent of the cobalt in solution was extracted and the raffinate from the solvent extraction contained 10 ppm $Co^{III}$. The overall current efficiency of the cell was 18 percent (i.e., 82 percent of the current was used to produce hydrogen), the energy consumption was 3 kwh/lb. cobalt. No cobalt metal was deposited on the porous cathodes in the course of the run.

EXAMPLE 2

The cell arrangement was as in Example 1. Four liters of cathode solution were prepared from Fisher reagent material and consisted of 2M ammonia, 1M ammonium carbonate and 1.19 g/l of cobalt (0.96 g/l of $Co^{III}$ and 0.23 g/l $Co^{II}$) at a pH 9.8. The anolyte consisted of 1M sodium sulfate at pH 9.5. Both anolyte and catholyte were pumped at 9.5 gallons per minute through the appropriate compartments. Solution temperature was 23° C. and a current of 6.6 amps was applied (equivalent to 25.5 amperes per square feet of cells' cross sectional area) at 2.7 volts. The electrolysis was carried out for 45 minutes. After 5 minutes the cobaltic concentration was reduced to 0.6 g per liter and the cobaltous concentration increased to 0.53 g per liter. After 45 minutes the cobaltic concentration was reduced to 0.01 g per liter, the cobaltous concentration was 0.30 g per liter and a substantial amount of the cobalt deposited on the cathode. About 73.6 percent of the current was used to produce hydrogen. The cobalt deposited on the porous cathode was subsequently stripped with 8 liters of "fresh" cobaltic ammine solution. The "fresh solution" had the same composition as that of the starting solution. The stripping was carried out for 45 minutes by pumping the "fresh" solution through the porous electrode. Cobaltic ammine concentration at the end of the run decreased to below 0.01 g/l while that of cobaltous ammine reached 1.81 g/liter.

These results show that the porous electrode cell is operative even under conditions by which cobalt metal deposits on the electrode and that this metal can be easily removed.

What is claimed is:

1. An electrolytic process for the reduction of $Co^{III}$ to $Co^{II}$ in an aqueous ammoniacal solution in an electrolytic cell, comprising an anode compartment, a cathode compartment and a permeable membrane in contact with the anode and located between the anode and cathode compartments and wherein said cathode compartment contains a porous electrode having a porosity in the range of from about 30 to 60 percent comprising introducing the aqueous ammoniacal cobaltic (III) solution into the cathode compartment of the electrolytic cell, providing an aqueous electrolyte in the anode compartment, applying direct current to the anode and cathode to produce cobaltous (II) ions in the cathode compartment while substantially preventing migration of cobaltous anions between the cathode and anode compartments by maintaining a permeable membrane between the anode and the porous cathode, removing produced gas from the anode compartment and removing the electrolyte containing cobaltous ions from the cathode compartment, wherein the electrolyte in the anode compartment is an aqueous solution of sodium sulfate, and wherein the cathode is treated with an aqueous ammoniacal cobaltic (III) solution for a time sufficient to dissolve any cobalt which may have deposited on said cathode.

2. The process of claim 1 which comprises conducting the electrolytic process at a temperature ranging from 20° C. to 90° C.

3. The process of claim 1 wherein the cathode is a stainless steel mesh.

4. The process of claim 1 wherein the electrolyte in the anode compartment is an aqueous ammoniacal solution.

5. The process of claim 1 wherein the electrolyte in the cathode compartment is an aqueous ammonia-ammonium sulfate solution or ammonia-ammonium carbonate solution.

6. The process of claim 1 wherein the aqueous electrolyte has a pH of from 8.5 to 10.

7. The process of claim 1 wherein the Eh of the aqueous electrolyte in the cathode compartment is reduced to the range of from $-50$ mv to $-100$ mv versus SHE.

8. The process of claim 1 wherein no cobalt metal is deposited on the porous electrode.

9. The process of claim 1 wherein the cathode is in contact with the permeable membrane.

* * * * *